Sept. 27, 1966 T. D. EARL ET AL 3,275,270
AIRCRAFT WITH GROUND EFFECT TYPE LANDING GEAR
Filed March 17, 1965 8 Sheets-Sheet 1
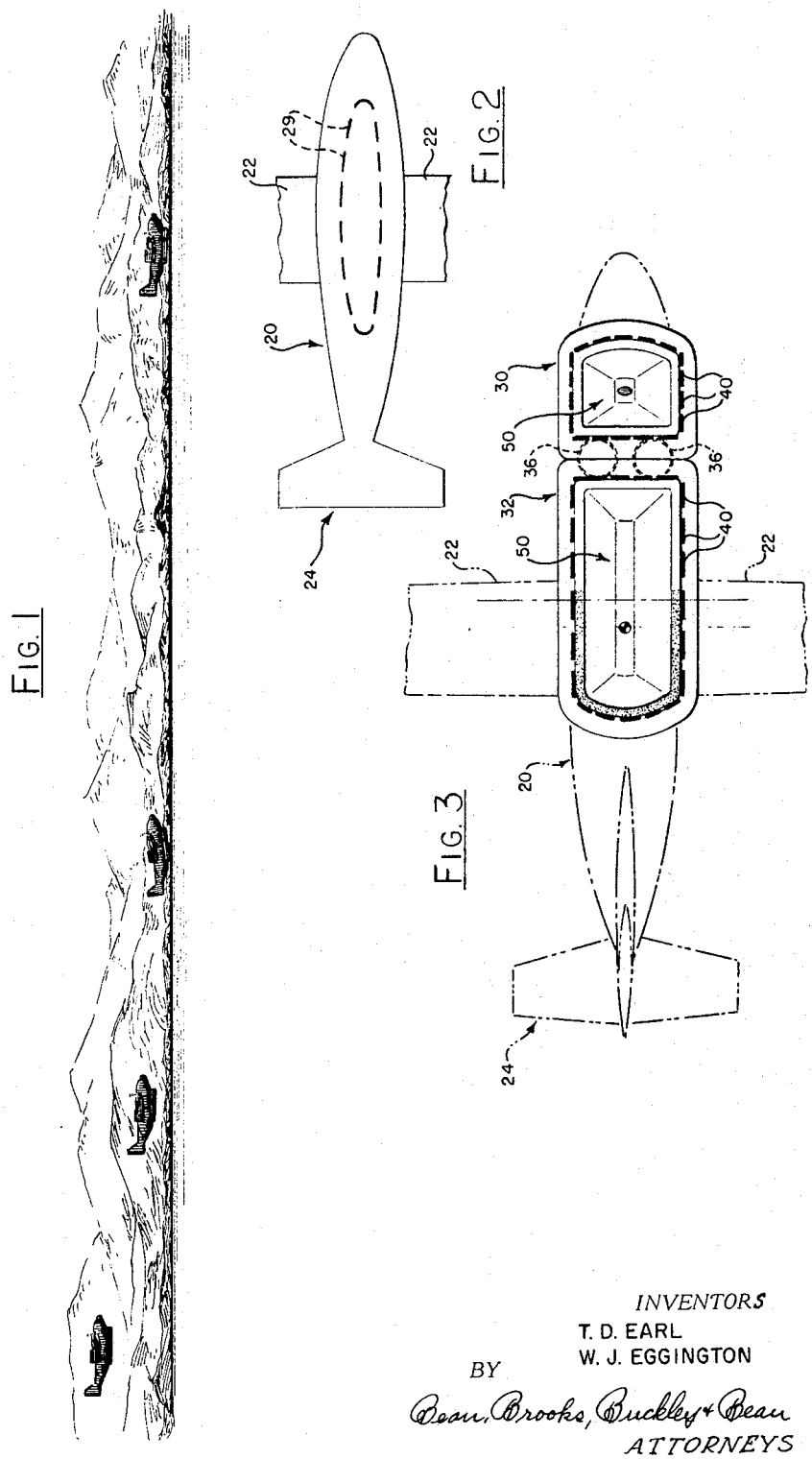
INVENTORS
T. D. EARL
W. J. EGGINGTON
BY
Dean, Brooks, Buckley + Bean
ATTORNEYS Sept. 27, 1966     T. D. EARL ET AL     3,275,270
AIRCRAFT WITH GROUND EFFECT TYPE LANDING GEAR Filed March 17, 1965     8 Sheets-Sheet 2

INVENTORS
T. D. EARL
W. J. EGGINGTON
BY
Bean, Brooks, Buckley & Bean
ATTORNEYS

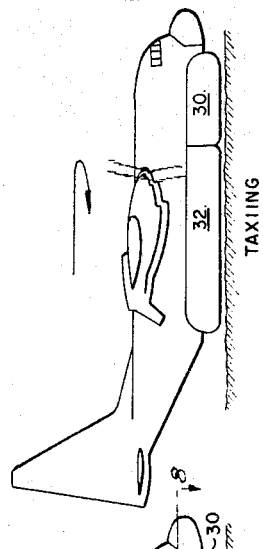
FIG. 5
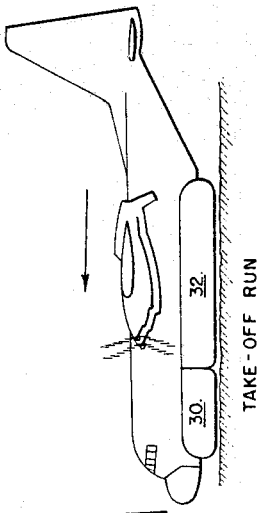
FIG. 6
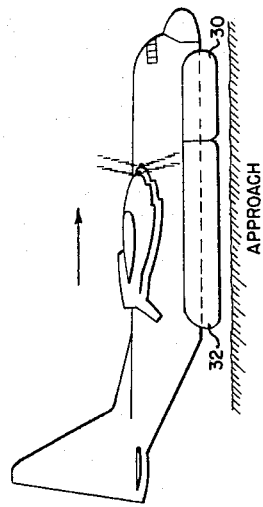
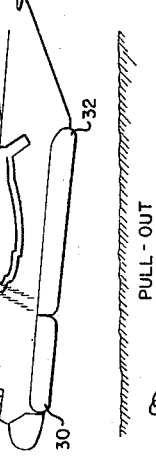
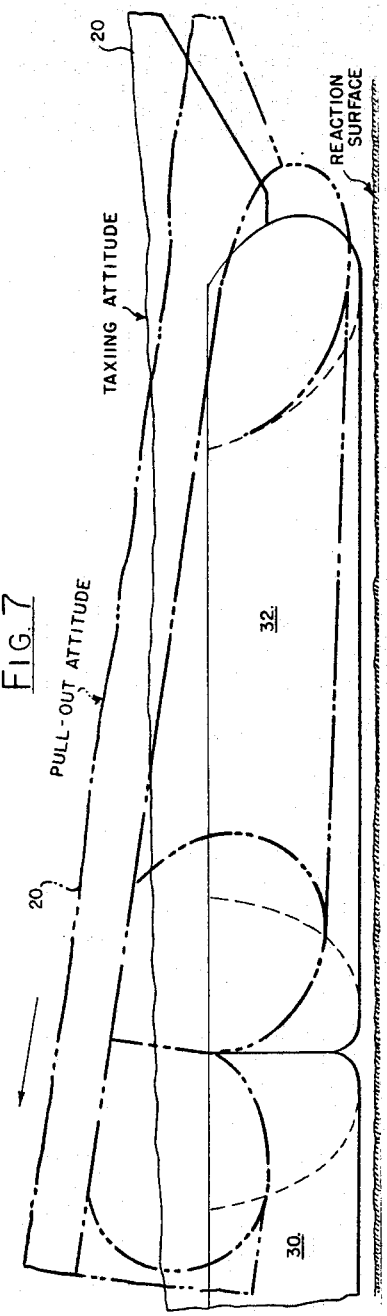
FIG. 7
INVENTORS
T. D. EARL
W. J. EGGINGTON
BY
ATTORNEYS

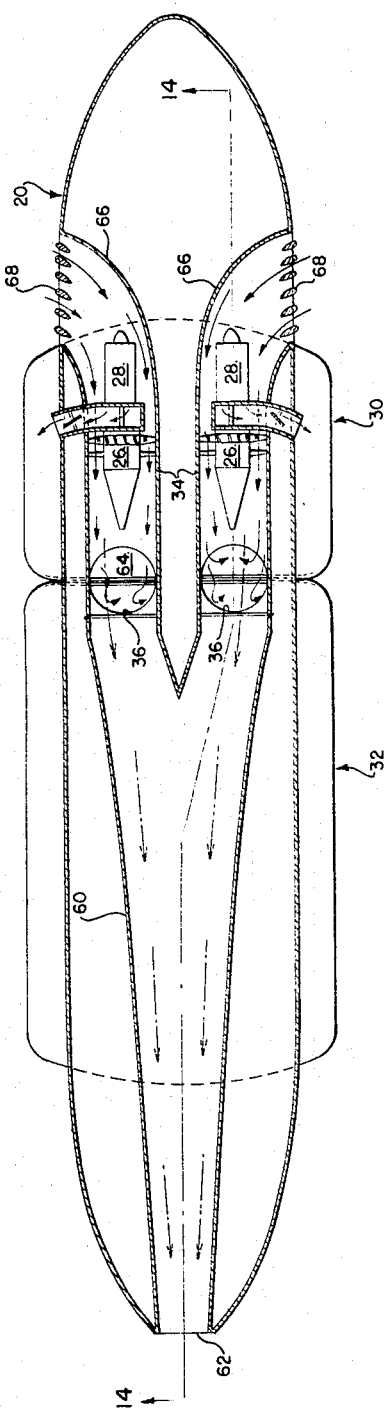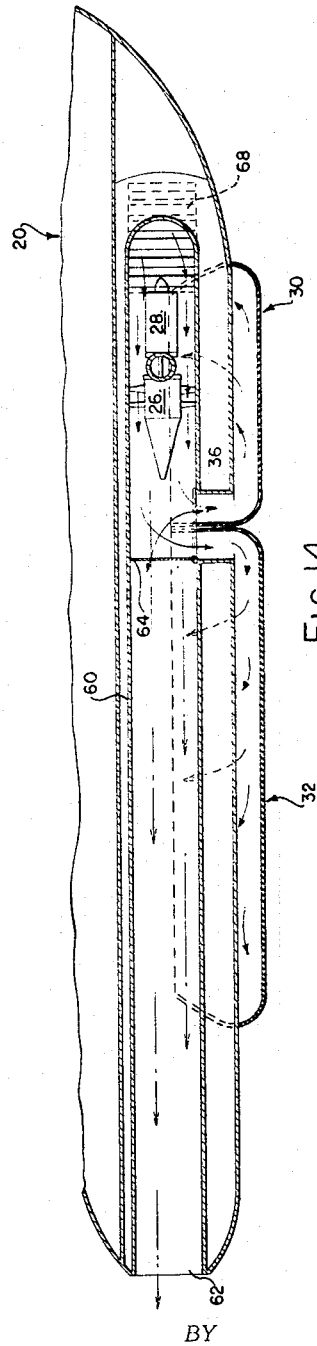

Sept. 27, 1966 T. D. EARL ET AL 3,275,270
AIRCRAFT WITH GROUND EFFECT TYPE LANDING GEAR
Filed March 17, 1965 8 Sheets-Sheet 8
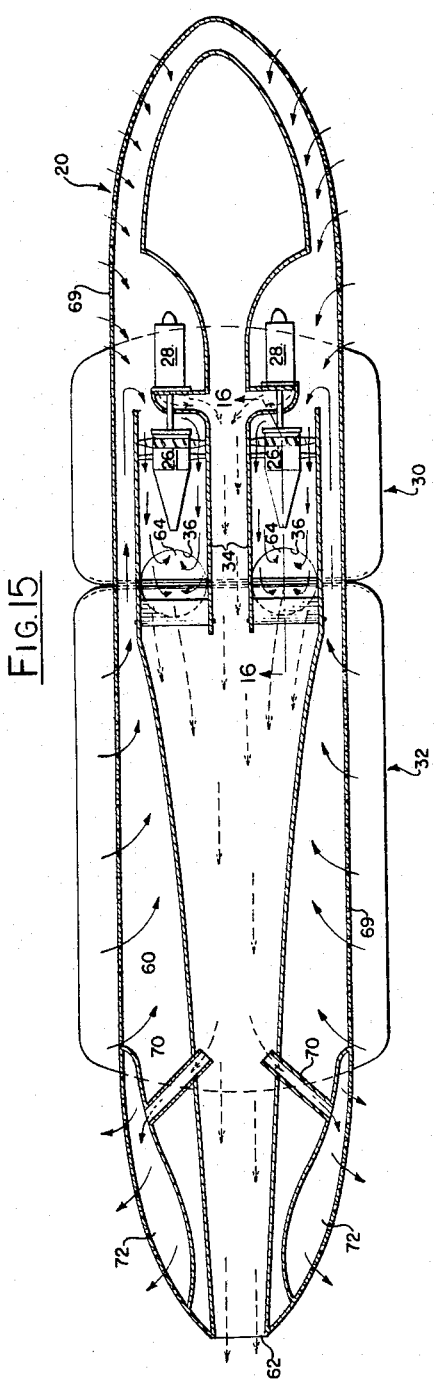
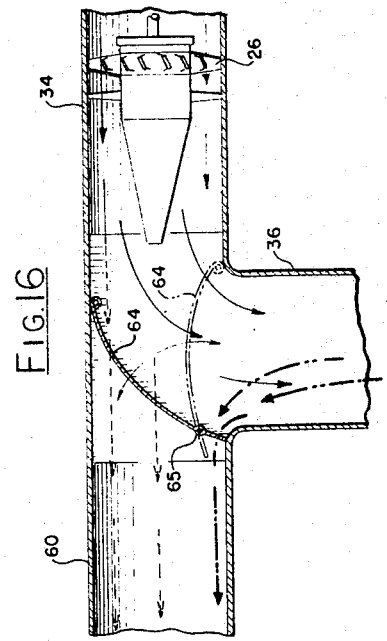
INVENTORS
T. D. EARL
W. J. EGGINGTON
BY
ATTORNEYS United States Patent Office 3,275,270
Patented Sept. 27, 1966

3,275,270
AIRCRAFT WITH GROUND EFFECT TYPE
LANDING GEAR
Thomas Desmond Earl, Niagara-on-the-Lake, Ontario, Canada, and Wilfred James Eggington, Clarence, N.Y., assignors to Bell Aerospace Corporation, Wheatfield, N.Y.
Filed Mar. 17, 1965, Ser. No. 440,437
16 Claims. (Cl. 244—110)

This invention relates to aircraft, and more particularly to an improved landing gear means for winged airplanes whereby an improved landing, and take-off and taxiing technique is made available to the industry. The invention is particularly advantageous for embodiment in high speed landing and take-off type airplanes. The term "airplane" as used herein is intended to relate to any form of aircraft having lift wing devices which are either truly "fixed" to the fuselage or are perhaps adjustable thereon so as to vary the sweep or incidence angles thereof, but in any case operating in the mode of the so-called "fixed-wing" type airplane which lands and takes off at relatively low angles to the land or water support surface, as distinguished from VTOL or helicopter type aircraft or the like.

Thus, a primary object of the invention is to provide an improved landing gear system for airplanes which functions during take-off and landing and taxiing operations, as well as during flight operations, all under pilot-control and in improved manner.

Another object is to provide an undercarriage system as aforesaid enabling airplanes to land and take-off with ease and facility from either conventional run-ways, or soft or only generally level and otherwise unprepared land surfaces, or water surfaces.

Still another object of the invention is to provide an airplane undercarriage system such as will make feasible and practicable high speed take-offs and landings on either conventional or inexpensively prepared unpaved runways or the like, or even on unprepared but generally level land, bog, marsh, snow or ice surfaces, or the like.

Another object is to provide an improved system as aforesaid whereby an airplane embodying the invention may with ease and safety land and take-off from bodies of water without requiring the aircraft to embody the structures of conventional amphibian or flying "boat" type aircraft.

Another object is to provide an undercarriage system as aforesaid which distributes landing shock and pressure loads over large underside areas of the fuselage, thereby eliminating the need for structural concentrations in the aircraft fuselage such as are required to transfer the stresses generated by conventional type landing gear systems, resulting in considerable overall weight savings.

Another object is to provide an improved landing gear arrangement as aforesaid wherein the structurally rigid parts thereof are at all times positioned out of harm's way in event of cross-wind or crash landing; and whereby the system successfully withstands (with only negligible, or no damage at all) landings under such severe conditions as would wreck conventional wheeled type undercarriage structures or the like.

Another object is to provide in a system as aforesaid an improved undercarriage arrangement which will successfully withstand without structural damage, lateral slip landings such as would wreck conventional wheeled type undercarriage structures or the like.

Further, it is an object of the invention to provide an improved undercarriage system as aforesaid wherein the undercarriage device generates a transient gas cushion under the aircraft when moving in friction-free manner in close proximity to the landing taxiing, or take-off surface; thereby supporting the plane in an improved load distribution manner relative to the land or water reaction surface, and resulting in reduced "foot-print pressures" when the craft is finally supported by the landing surface.

Another object is to provide an improved airplane undercarriage system as aforesaid which will permit take-offs and landings in any desired direction independently of the local wind direction.

Another object is to provide an improved undercarriage system for high speed landing and take-off airplanes permitting simultaneous use of parallel landing strips, thereby providing maximum traffic capacity for a given air base area.

Another object is to provide an improved undercarriage system as aforesaid which will eliminate the hazards of emergency airplane landings on rough ground or water; and which after "ditching" of an aircraft operating over water will operate to keep the plane afloat and/or enable it to operate as a ground effect vehicle while reaching a position of safety.

Generally stated, the primary objects of the invention may be attained by providing means carried by the airplane for projecting (under pilot control) one or more blasts of pressurized fluid, generally air, downwardly from the airplane against the land or water surface relative to which the airplane is landing, taxiing, or taking off. Thus, transient cushions of pressurized air or the like are formed between the airplane fuselage and said surface, of such nature as to be capable of holding off the airplane from actual contact with the surface as the craft completes its landing, taxiing, or take-off run.

By way of example, and as shown in the drawing herewith, one preferred form of undercarriage system of the invention includes inflatable cell devices which in plan view are of generally annular configurations, and located at the belly portion of the airplane. The cells are normally (when in flight regime) deflated and nested into the airplane body to provide an aerodynamically "clean" fuselage; but are inflatable to extend outwardly and downwardly below the fuselage when being called upon to function as undercarriage means. Under this condition they assume the shapes of annular balloon-like elastic cushion devices circumscribing open air-cushion holding spaces therewithin. Pressured air supply means carried within the aircraft are provided to discharge jets of air through and perimetrically outwardly of the cell devices and downwardly therefrom in such manner as to produce peripheral jet curtains operating to generate and retain ground effect air cushions acting against the airplane landing surface when the airplane is in close proximity thereto.

Hence, another object of the invention is to provide an airplane undercarriage device as above described, including inflatable cell members which are deflatable and retractable in improved manner when the airplane is in flight to conform to the contour of the airplane fuselage for flight efficiency purposes.

Another object is to provide an undercarriage arrangement as aforesaid, wherein the pressured air supply means may be arranged to also provide boundary layer air control effects at the external surfaces of the aircraft fuselage, for improved flight performance purposes.

More specifically, by way of example and as illustrated herewith, one form of the invention involves the provision of one or more generally annular-shaped resilient cell devices which form, when the airplane is in flight regime, portions of the fuselage belly skin surface; and which are inflatable under pilot control as the airplane approaches a landing surface so as to belly out from the fuselage, thereby providing a toroidal-shaped cell or cells extending below the fuselage. Air outlet slots through the bottom surfaces of the inflated cells then permit streams of high velocity air to jet downwardly and peripherally of the cell or cells. Hence, for example when the airplane is approaching a landing it may be flown flatwise relative to the landing surface, and as it sinks toward the surface and just prior to the time the fuselage would otherwise come into frictional contact with the ground, there will be thereby created an air cushion or cushions under the fuselage in the areas circumscribed by the inflated cells.

As the bottom perimetral portions of the cells come within inches of the landing surface, the air cushion effects developing therewithin and reacting against the fuselage take over the vertical support of the aircraft and its load, thereby causing the craft to skim over any reasonably level landing surface without actual contacts therewith. Incidental to a landing, upon completion of the transition from air-borne to ground effect support regime, the forward motion of the aircraft may be braked by reversal of the aircraft propulsion system, or by use of retro-rockets, or by the lowering of friction brake devices against the landing surface, or by any other suitable means as may be preferred. Or, alternatively, the forward motion of the craft may be braked by pitching the craft so as to drag a rear end portion of the air cell structure against the landing surface; the air cell surface being in this case protected by means of a wear-resistant coating or the like, as will be explained in more detail hereinafter.

The invention further contemplates novel optional modifications of the basic system. For example, it is contemplated that the intake of air to the fans supplying the air cells may be drawn through the aircraft fuselage skin at strategic positions therealong for boundary layer air control purposes. Also, if desired the air discharging from the fans may be arranged to be alternatively diverted to jet discharge means directed rearwardly of the craft. Thus, during all flight regimes and particularly during climb-out, the ground effect air supply engine and fan system may be usefully employed to augment the primary propulsion system of the aircraft. Other novel features and specific objects of the present invention will also be apparent form the following specification illustrating by way of example several possible embodiments of the invention as shown in the accompanying drawings wherein:

FIG. 1 is a pictorial illustration of a landing and taxiing maneuver of an aircraft embodying the present invention;

FIG 2 is a bottom plan view of an aircraft fuselage embodying one form of the invention;

FIG. 3 is a view corresponding to FIG. 2 of another form of undercarriage arrangement of the invention;

FIG. 5 is a composite three-positional view in side elevation, showing an airplane such as that of FIGS. 3, 4, when performing a landing and taxiing maneuver;

FIG. 6 is a view corresponding to FIG. 5 but showing the airplane in a take-off run and climb-out maeuver;

FIG. 7 is an enlarged scale fragmentary vertical section schematic view of the undercarriage portion of the airplane when commencing a climb-out maneuver as illustrated by the central figure of FIG. 6;

Figure 8:
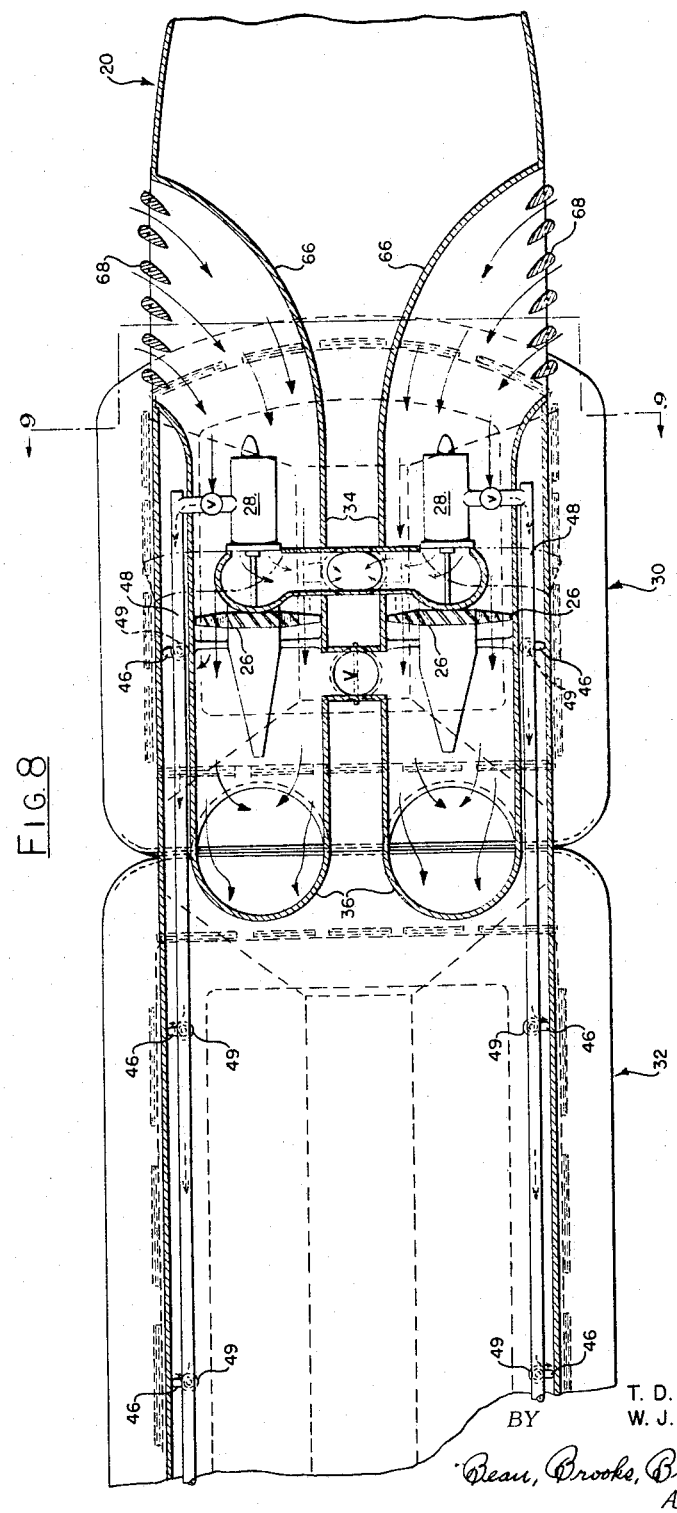
FIG. 8 is a fragmentary horizontal sectional view through a portion of the fuselage of the aircraft of FIGS. 3–7 as indicated at 8—8, FIG. 5.
Figure 10:
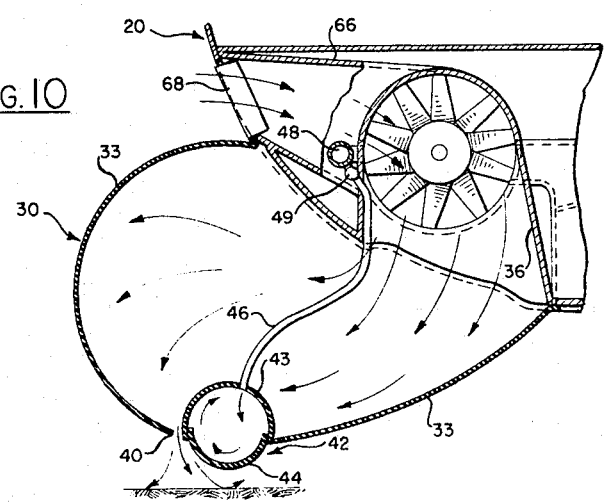
FIG. 10 is a view corresponding to the left hand side portion of FIG. 9, showing one portion of the air cell and peripheral jet device in its "ground effect" operative condition.
Figure 11:
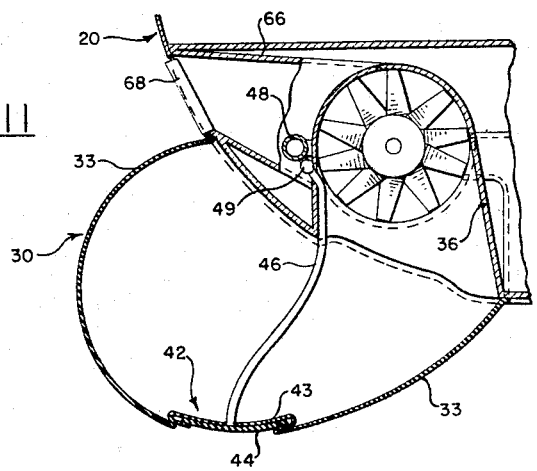
Figure 12:
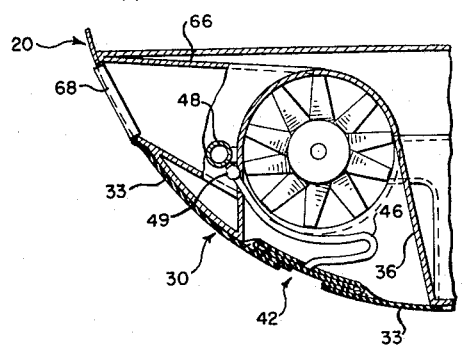

FIG. 11 corresponds to FIG. 10 but illustrates the device thereof in an initial stage of deflation-retraction;

FIG. 12 corresponds to FIGS. 10, 11, but illustrates the device in full deflated and retracted condition, as when the aircraft is in normal flight;

FIG. 13 corresponds to FIG. 8 but illustrates how the air fan discharge system may be selectively diverted to assist in propulsion of the aircraft when in flight regime;

FIG. 14 is a vertical sectional view taken as suggested along line 14—14 of FIG. 13;

FIG. 15 corresponds to FIG. 13 but illustrates a modified form of air fan intake arrangement; and FIG. 16 is a fragmentary sectional view, on enlarged scale, taken as suggested by line 16—16 of FIG. 15.

As explained hereinabove, the invention may be embodied in any type airplane; and as shown by way of example by the accompanying drawing, it may be incorporated in an airplane comprising generally a fuselage or body 20; wing panels 22—22; empennage 24; and engine-prop or jet or other propulsion power supply means as indicated generally at 25. However, it is to be understood that the invention may be embodied in any other type or style of airplane.

More especially, the invention is provided to comprise a pressured fluid supply such as for example a compressed air supply device means carried within the airplane body; and as shown at FIGS. 8, 9, 13, 14, 15, 16, for example, such means may comprise a pair of compressor fans 26—26 driven by corresponding turbines (or other type engines) 28—28. The engines 28—28 may be fueled and arranged for pilot-control in any desired manner, and suitable ducting is associated with the compressor fans to provide for intake of air to the compressors from any preferred points externally of the fuselage, and for discharge of compressed air (when the undercarriage system is functioning) downwardly below the airplane belly in such manner as to generate therebelow a transient "air cushion" effect whenever the craft is in close enough proximity to a landing ground or water surface.

Thus, for example, as shown in FIG. 2, the compressed air discharge ducting may be arranged to discharge blasts or jets of air downwardly from the fuselage belly through orifices or slots as indicated at 29 which are preferably arranged in bottom plan view to define a "peripheral curtain" circumscribing an air cushion generating space therewithin. For this purpose the slots 29 are all preferably directed somewhat inwardly so as to operate with appreciable inwardly directed thrust vectors, thereby contributing to the "strength" of the "peripheral curtain" of air which operates to generate the transient air cushion between the fuselage and the landing surface. Whereas FIG. 2 illustrates provision of means for only one air cushion between the fuselage and the landing surface, it is to be understood that the air jet orifices or slots may be so provided as to delineate any other preferred number of air cushion areas; and that such cushions may be relatively positioned under the airplane belly or under the wings in the case of a delta wing vehicle, so as to be in any desired pattern of longitudinally and laterally spaced relationships, in order to attain the preferred pitch and roll control characteristics.

FIGS. 3–15 illustrate another form of undercarriage arrangement of the invention wherein two, longitudinally separate, air cushion providing devices are employed. Furthermore, in this form the air jet openings are embodied in flexible, alternately inflatable-deflatable, balloon-like cell devices which normally nest into the aerodynamic contour of the airplane fuselage, but which when operating in "undercarriage" mode extend outwardly and downwardly of the airplane fuselage "belly" in the form of toroidal-shaped cells. The air jet openings per se are provided in the form of any desired shape of orifices, slots, or the like, aligned around and under the bottom peripheries of the cell devices when inflated. The jet openings are preferably constructed so as to direct their air blasts inwardly as well as downwardly so as to provide efficient "curtains" of air circumscribing the air cushion generating areas therewithin.

Figure 4:
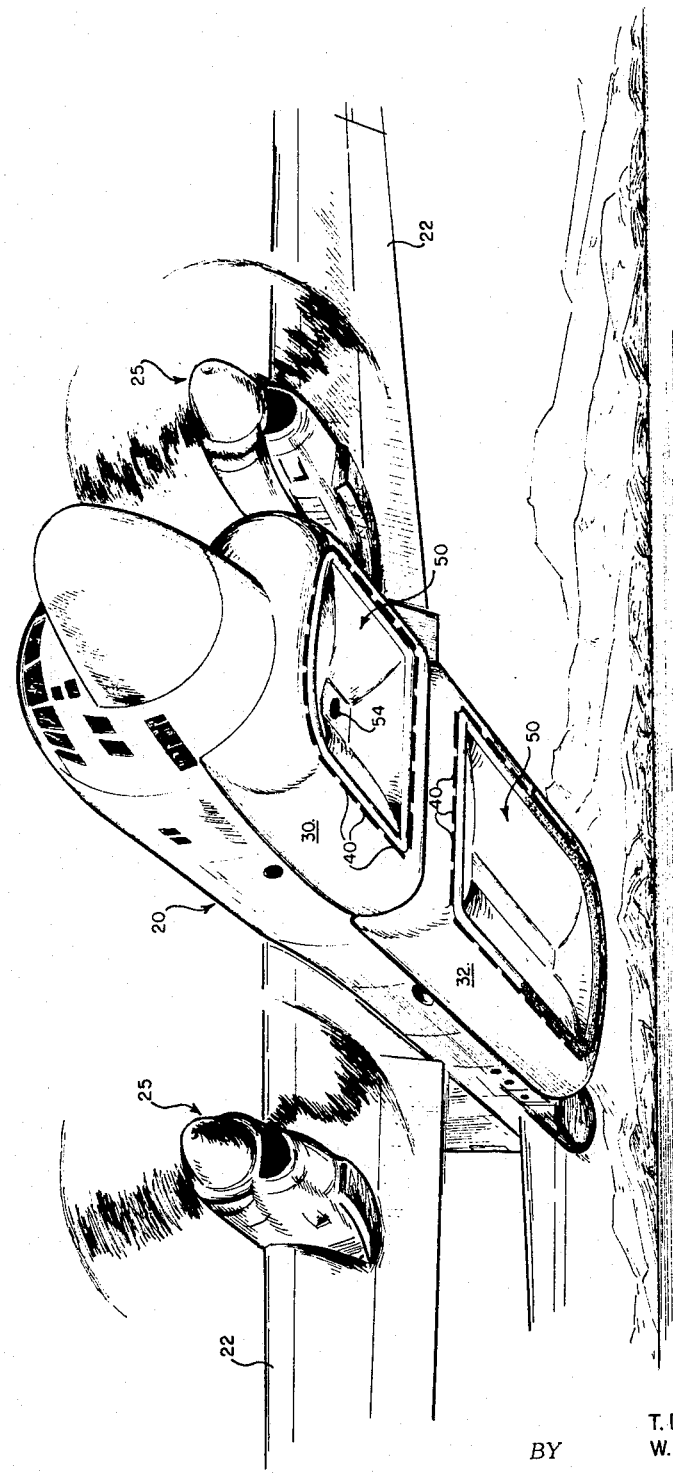
FIG. 4 is a front-bottom perspective view of an aircraft such as shown in FIG. 3.

More specifically, FIGS. 3–15 show an airplane as above described equipped with a pair of air cushion generating cells indicated generally at 30 and 32, respectively. As shown at FIG. 12, these cells are normally (when in flight regime) deflated and retracted into aerodynamic profile conformity with the airplane fuselage when the compressed air supply system is either inoperative, or, as shown at FIGS. 13–15, operative but controlled to divert its discharge thrust through nozzles at the rear of the airplane for propulsion augmentation. The cell devices 30, 32 may be constructed of any suitably flexible sheet material as indicated at 33 which is preferably elastic in girth-wise directions, and are preferably fabricated so as to resiliently retract of their own accord into tautened, fuselage-contour-conforming condition, as shown in FIG. 12 when no compressed air is being pumped thereinto. However, when air pressure is supplied therein (as will be explained more fully hereinafter) the cells balloon out and downwardly below the airplane fuselage as shown in FIGS. 3–15, and perhaps as best illustrated at FIG. 4.

Figure 9:
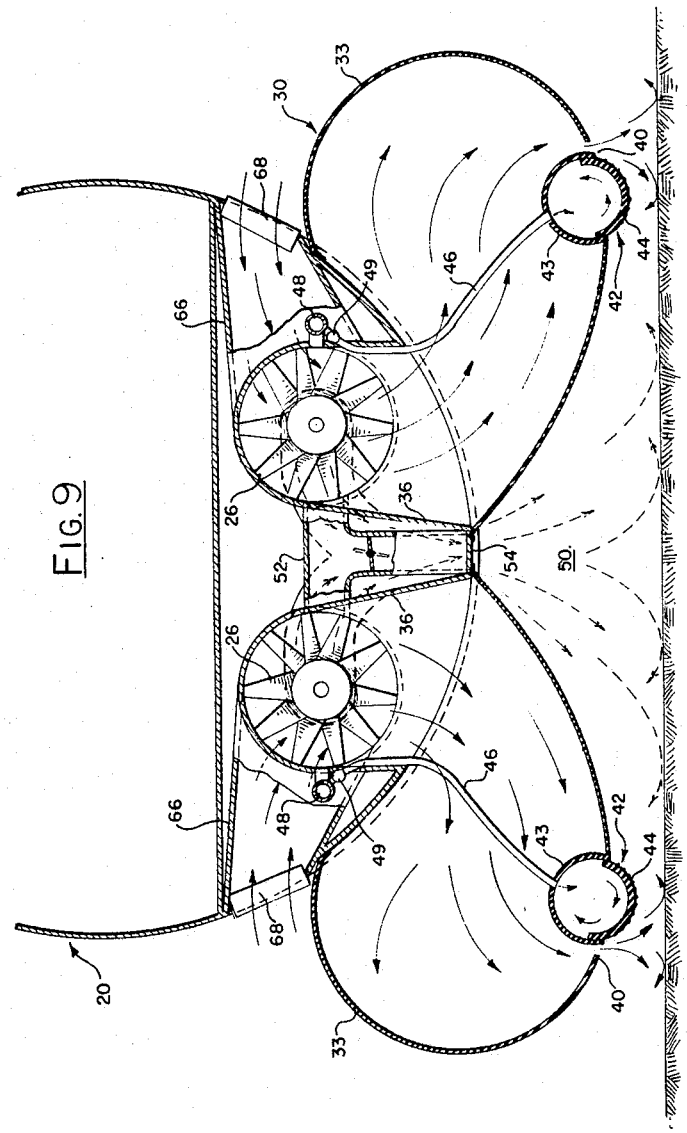
FIG. 9 is a transverse vertical sectional view thereof, on enlargedl scale, taken as suggested along line 9—9 of FIG. 8.

The cells are fed with air under pressure from the fans 26—26 by means of any suitable ducting, and as shown herein the ducting may comprise housings 34—34 enclosing the fans 26—26 and leading to downspouts 36—36 which discharge through the airplane fuselage skin into the rear ends and front ends respectively of the cells 30, 32 (FIGS. 8–14). Thus, pumping of air through the downspouts 36—36 will cause the cells to balloon out as into the configuration shown in FIGS. 10, 11. As indicated at 40, the cells 30, 32 are slotted along their bottom "foot-print" surfaces to permit jets of compressed air to blast downwardly therefrom as shown in FIGS. 9, 10.

A valve device for the slots of each cell is provided as indicated generally at 42. Each valve may, as shown herein, comprise a rubber tube or the like formed for example to comprise a relatively pliable upper wall portion 43 joined integrally with a relatively stiffer bottom wall portion 44; the cylinder thus formed being constructed to normally take a "set" so as to lie in flattened condition (FIGS. 11–12). Inflation tubes 46 lead into each valve device from conduits 48 taking high-pressure air from the high pressure stage portions of the compressor casings; the flow of air being controlled as by a valve 49 in the line of each air supply tube.

By virtue of this valve arrangement, wherever the airplane approaches a landing (FIGS. 1, 4, 5) the compressors may be operated to discharge through the downspouts 36—36 and into the cells 30, 32, thus causing the cells to initially balloon out from the condition shown in FIG. 12 as to the condition shown in FIG. 11. High pressure air is simultaneously let into the tubes 46 through valves 49 so as to cause the valve cylinders 42 to inflate as to the condition shown in FIG. 10. This valve "opening" action uncovers the slots 40 so that air from the cells now blasts downwardly through the slots as shown in FIGS. 9, 10. Note that the curved bottom surfaces of the valve cylinders 42 induce the establishment of the so-called "coanda effect" which operates to drag the discharge air curtain inwardly and under the device, to more effectively feed the air cushion generating space which is designated 50 in the drawing. Thus the inflated cells and the curtains of compressed air blasting out of the slots 40 cooperate to build and maintain a transient "air cushion" under the fuselage belly wherever the latter comes into close enough proximity with a reaction surface as illustrated by FIGS. 8, 9, 10. As shown in FIG. 9, the air feed to the cushion area 50 may be supplemented if desired as by means of a branch duct 52 leading from the main ducts and delivering downwardly through a centrally located opening 54 in the fuselage (FIGS. 3, 4, 9).

It is of course to be understood that various valve and other control devices will be employed in conjunction with the compressor engine and the discharge ducts and the valve tubes etc. under pilot control (either manual or automatic) to provide the pilot with all desirable selective and/or differential controls for these mechanisms. Hence, an airplane embodying the present invention may come in for a landing as pictured for example at FIGS. 1, 4, 5, relative to any surface that will "react" to the "ground effect" or transient "air cushion" which develops under the belly of the aircraft fuselage as explained hereinabove; and to provide the requisite "reaction" for support of the craft the surface need not be a conventional type "paved" landing strip or the like. It need only be generally level, and may comprise a body of water, or marsh land, or soft dirt or sand or flat rock or snow or ice; but in any case the craft will be held off from actual physical contact with the surface and will simply skim along in friction-free manner above it.

Reversal of the propulsion propellers or jet engine thrust direction, or lowering of drag brakes or the like, will then bring the craft to a halt while still being suspended (by a matter of inches) above the landing surface. It may now be taxied as desired in the manner of a conventional "ground effect machine." Take-off maneuvers are effected by reversal of the process. After loading, the craft is elevated by operation of the compressors into its "ground effect" regime, and the propulsion engines are then brought into action to taxi the craft into the take-off maneuver. Take-offs are facilitated because of the friction-free relationship of the craft to the landing surface during the take-off run. Immediately upon becoming air-borne in the airplane sense the pilot may adjust the system controlling the compressor output so as to divert the compressor discharge thrust through ducting directing the discharge into the atmosphere behind the aircraft, thus augmenting the driving effects of the propulsion engine system of the aircraft.

For example, as shown in FIGS. 3–16 herewith, the ducts 34—34 may be arranged to discharge alternatively into the downspouts 36—36 or into a common, rearwardly directed duct 60 terminating in a discharge orifice 62 at the rear end of the aircraft fuselage. A valve device as indicated at 64, and pivotally mounted as shown at 65 (FIG. 16), may be conveniently employed under pilot control, to alternatively direct the compressor outputs to either the downspouts 36—36 or the propulsion augmented duct 60, as required.

As shown in FIGS. 8–14, the air intakes to the compressors 26—26 may be provided through means of ducts 66 leading from louvered openings as indicated at 68—68 through the fuselage skin surfaces. As shown therein, louvers for alternately opening and closing the intake openings are preferably employed, to enhance the aerodynamic surface of the fuselage when the compressors are inactive.

It is another feature of the present invention that the intake air for the compressors 26—26 may be conveniently drawn from the external surface of the fuselage at any preferred area thereof and at any preferred degree therefrom, so as to simultaneously provide the requisite compressor feed and at the same time to develop a preferred boundary air layer control effect relative to the aircraft fuselage such as taught for example in U.S. Patent No. 3,100,539. Thus, as shown in FIG. 15 herein, the compressor intakes may be arranged to draw air from between a double-walled fuselage construction; the outer wall 69 of which is perforated as preferred to permit controlled ingress of air through the outer skin structure of the fuselage (as shown by the air flow direction arrows of FIG. 15). Thus, the intake of air by the compressors 26—26 not only supplies the undercarriage mechanism and/or augments the propulsion power units of the aircraft, but also enhances the aerodynamic efficiency of the aircraft fuselage through selective control of the boundary air layer relative thereto; it being understood that the means controlling ingress of air through the outer skin structure of the aircraft will be selectively constructed and controlled, relative to various stations longitudinally and girthwise of the fuselage, so as to provide the preferred boundary air layer control results.

It should be noted that, as shown in FIG. 16, whenever the valves 64 are adjusted to divert the compressor discharges into the rearwardly directed propulsion-augmentation duct 60, an open space is provided below the valve plate pivot 65 through which air is automatically sucked up through the downspouts 36 from the interiors of the cells 30, 32. Thus, immediately upon becoming airborne, the airplane pilot may control the valves 64—64 to move them to their broken line positions as shown in FIG. 16. The compressor outputs will thereupon augment the propulsion engine outputs and will at the same time induce evacuation of the cells 30, 32; whereby the latter will quickly retract into fuselage-hugging configurations, enhancing the climb-out maneuver.

FIG. 15 illustrates a further modification of the air flow control system of the invention, wherein a portion of the rearwardly directed compressor discharge is bypassed through conduits 70—70 into double-walled chambers 72—72 at the rear of the aircraft. The outer wall portions of the fuselage in the regions of the chambers 72—72 are perforated to permit the compressor-driven air to bleed therethrough and thus "feed" the boundary air layers externally of those portions of the fuselage. Thus, it will be appreciated, by means of the examples shown and described, that any desired boundary air layer "control" effect may be easily attained at any desired area of the aircraft fuselage; as a supplement to and in augmentation of the primary objects and beneficial results of the present invention.

FIGS. 5, 6, 7, illustrate how the inflated cells 30–32 enhance the landing and take-off maneuvers of the airplane. As shown at the left hand end portion of FIG. 5, the airplane may fly in for a landing in "normal" horizontal attitude until it "settles" into such close proximity to the landing surface that the "ground effect" forces assume vertical support of the craft. The propellers (or the jet thrust controls) may then be reversed, or brakes lowered, or the like, to bring the craft to a standing or taxiing attitude, as shown at the right hand end portion of FIG. 5. The central portion of FIG. 5 illustrates how the craft may be controlled to drag the rear end of the cell 32 on the landing strip for braking purposes, if desired. FIG. 6 illustrates how the craft is maneuvered during a take-off run and climb-out. At the right hand end of FIG. 6 the craft is starting the take-off run. At the center portion of the figure the nose is being lifted, and as shown in FIG. 7, at this stage of the operation the rear cell 32 is supplying the maximum "ground effect" support for the craft at the heel end portion of the cell. The front end of cell 32 is lifted away from the reaction surface and is freely "spilling" its air content, and is relatively relaxed and normal in configuration; while the rear end portion of cell 32 is carrying the remaining brunt of the air cushion support load and is accordingly under greater pressures in all directions. However, the fabric of the cell structure is preferably of such nature as to be elastic in girthwise directions only, whereby the "heel" portion of the cell 32 will, under take-off conditions, compact itself somewhat vertically without substantial drag-out at the rear end thereof (FIG. 7). The above described adjustments of the cell configuration take place while at the same time the bottom profile portion of the cell continues to adapt and conform itself to the changing attitude relation to the landing surface. That is, the bottom peripheral portion of the cell remains in slightly spaced relation to the reaction surface, thereby providing the requisite vertical support of the aircraft while avoiding damaging frictional contacts with the reaction surface.

Whereas only a few forms of gas-cushion cell arrangements have been illustrated and described hereinabove by way of example, it will of course be appreciated that a variety of other cell arrangements (in regard to cell planform shapes and number of cells and relative planform dispositions thereof) may be employed. FIGS. 3–4 for examples show merely a preferred cell arrangement which embodies the use of two cells in tandem relation as illustrated at 30, 32. The larger cell 32 is approximately centered (longitudinally of the craft) slightly behind the overall center of gravity of the airplane, while the smaller cell 30 is located forwardly thereof; thereby simulating the arrangement of a tricycle type wheeled undercarriage and providing the craft with similar landing and take-off handling characteristics from the pilot standpoint. However, it is to be understood that any other preferred number and shape of cells may be employed, and in any other preferred planform relationship, in order to support the airplane and provide the preferred landing, taxiing, and take-off handling characteristics. Also, it is to be understood that if desired, the undercarriage system herein illustrated and described may be supplemented by means of suitable "outrigger" support devices such as pad or wheel or float carrying struts selectively employable to support the airplane when at rest relative to a landing surface with the compressor system idle.

Thus, it will be appreciated that by virtue of the present invention an undercarriage system for airplanes is provided which features elimination of need of any wheeled or otherwise structurally rigid externally projecting components; employing in lieu thereof an alternately inflatable-deflatable elastic balloon-like cell arrangement circumscribing an air cushion space beneath the belly of the fuselage. Hence, the airplane is adapted to land relative to any reasonably flat surface, although the latter may be unpaved and in fact may comprise nothing more than soft dirt, water, or the like; and is capable of "landing" and taking off relative thereto without actual contacts with the surface, being supported by a matter of inches thereabove. Furthermore, the invention features selective utilization of air compressor mechanism carried by the aircraft to render the undercarriage mechanism operative and alternatively for augmenting propulsion of the aircraft and/or providing improved control of the boundary air layer externally of the aircraft fuselage; and it is to be understood of course that although only a few forms of the invention have been illustrated and described in detail hereinabove, various changes may be made therein without departing from the spirit of the invention or the scope of the accompanying claims.

We claim:

1. In an airplane, an undercarriage comprising an elastic cell structure attached to the airplane fuselage and adapted to be inflated into a balloon-like shape, means carried within the airplane for delivering relatively low pressure gas into said cell and thereby inflating said cell into an extended balloon-like form circumscribing a gas cushion space under the airplane fuselage, said cell being formed with gas outlet openings aligned peripherally of the bottom contour of said cell when inflated, elastically closed valve means associated with the outlet openings of said cell and means for delivering relatively high pressure gas to said valve means for actuating the latter to open condition whereby to permit gas to blast through said outlet openings and to feed said gas cushion space with pressured gas for generation of airplane supporting ground effect forces whenever the airplane is disposed in close proximity to a reaction surface.

2. In an airplane, an undercarriage comprising an elastic cell structure attached to the airplane fuselage and adapted to be inflated into a balloon-like shape, air-compressor means carried within the airplane for pumping air into said cell and inflating said cell into extended balloon-like form thereby circumscribing an air cushion space under the airplane fuselage, said cell being formed with air outlet openings aligned peripherally of the bottom contour of said cell when inflated, valve means associated with the outlet openings of said cell, and means carried by the airplane for actuating said valve means to open condition whereby to permit air to blast through said openings and to feed said air cushion space with pressured air for generation of airplane supporting ground effect forces whenever the airplane is disposed in close proximity to a reaction surface.

3. In an airplane, an undercarriage comprising an elastic cell structure attached to the airplane fuselage and adapted to be inflated into a balloon-like shape, compressor means carried within the airplane for pumping gas into said cell and inflating said cell into extended balloon-like form thereby circumscribing a gas cushion space under the airplane fuselage, said cell being formed with gas outlet openings aligned peripherally of the bottom contour of said cell when inflated, valve means associated with the outlet openings of said cell, and means for actuating said valve means to open condition whereby to permit gas to blast through said openings and to feed said gas cushion space with pressured gas for generation of airplane supporting ground effect forces whenever the airplane is disposed in close proximity to a reaction surface.

4. In an airplane, an undercarriage comprising an elastic cell structure attached to the airplane fuselage and adapted to be inflated into a balloon-like form, air compressor means carried within the airplane for drawing air from externally of the airplane fuselage and pumping it into said cell and inflating said cell into extended balloon-like form thereby circumscribing an air cushion space under the airplane fuselage, said cell being formed with air outlet openings, valve means associated with the outlet openings of said cell, and means for actuating said valve means to open condition when said cell is inflated whereby to permit air to blast through said openings and to feed said air cushion space with pressured air for generation of airplane supporting ground effect forces whenever the airplane is disposed in close proximity to a reaction surface.

5. In an airplane, in combination, an elastic cell structure attached to the airplane fuselage and adapted to be inflated into a balloon-like form, air compressor means carried within the airplane and having air intake means in communication with a duct device leading to the aerodynamic skin surface of said fuselage for drawing air from externally of the airplane fuselage and pumping it into said cell and inflating said cell into extended balloon-like form thereby circumscribing an air cushion space under the airplane fuselage, said duct device having openable-closeable louver means in alignment with the fuselage skin profile for controlling inlet of air to said duct, said cell being formed with air outlet openings, valve means associated with the outlet openings of said cell, and means for actuating said valve means to open condition when said cell is inflated whereby to permit air to blast through said openings and to feed said air cushion space with pressured air for generation of airplane supporting ground effect forces whenever the airplane is disposed in close proximity to a reaction surface.

6. In an airplane, an elastic cell structure attached to the airplane fuselage and adapted to be inflated into a balloon-like form, said fuselage having an air pervious skin portion, air compressor means carried within the airplane for drawing air from externally of the airplane fuselage through said skin portion and pumping it into said cell and inflating said cell into extended balloon-like form thereby circumscribing an air cushion space under the airplane fuselage, said cell being formed with air outlet openings, valve means associated with the outlet openings of said cell, and means for actuating said valve means to open condition when said cell is inflated whereby to permit air to blast through said openings and to feed said air cushion space with pressured air for generation of airplane supporting ground effect forces whenever the airplane is disposed in close proximity to a reaction surface.

7. In an airplane, an undercarriage comprising an elastic cell structure attached to the airplane fuselage and adapted to be inflated into a balloon-like form, a branch duct carried within said fuselage and having one branch portion thereof arranged to deliver into said cell structure and another branch portion thereof arranged to deliver into the atmosphere rearwardly of said fuselage, air compressor means carried within the airplane for drawing air from externally of the airplane fuselage and pumping it into said branch duct and selectively into said cell for inflating said cell into extended balloon-like form thereby circumscribing an air cushion space under the airplane fuselage and alternatively rearwardly of said fuselage, said cell being formed with air outlet openings, valve means associated with the outlet openings of said cell, and means for actuating said valve means to open condition when said cell is inflated whereby to permit air to blast through said openings and to feed said air cushion space with pressured air for generation of airplane supporting ground effect forces whenever the airplane is disposed in close proximity to a reaction surface.

8. In an airplane, an elastic cell structure attached to the airplane fuselage and adapted to be inflated into a balloon-like shape, a branch duct leading to said cell and to a position of discharge directed rearwardly of the airplane, air-compressor means carried within the airplane for pumping air into said branch duct and under control of a valve device alternatively into said cell for inflating said cell into extended balloon-like form thereby circumscribing an air cushion space under the airplane fuselage or rearwardly of said fuselage, said cell being formed with air outlet openings aligned peripherally of the bottom contour of said cell when inflated, valve means associated with the outlet openings of said cell, and means carried by the airplane for actuating said valve means to open condition whereby to permit air to blast through said openings and to feed said air cushion space with pressured air for generation of airplane supporting ground effect forces whenever the airplane is disposed in close proximity to a reaction surface.

9. In an airplane, an undercarriage comprising an elastic cell structure attached to the airplane fuselage and adapted to be inflated into a balloon-like shape, a branch duct leading to said cell and to a position of discharge directed rearwardly of the airplane, compressor means carried within the airplane for pumping gas into said branch duct and under control of a valve device alternatively with said cell and inflating said cell into extended balloon-like form thereby circumscribing a gas cushion space under the airplane fuselage or rearwardly of said fuselage, said cell being formed with gas outlet openings aligned peripherally of the bottom contour of said cell when inflated, valve means associated with the outlet openings of said cell, and means for actuating said valve means to open condition whereby to permit gas to blast through said openings and to feed said gas cushion space with pressured gas for generation of airplane supporting ground effect forces whenever the airplane is disposed in close proximity to a reaction surface.

10. In an airplane, an undercarriage comprising an elastic cell structure of toroidal plan form attached to the airplane fuselage and adapted to be inflated, compressor means carried within the airplane for pumping air into said cell and inflating said cell into extended balloon-like form thereby circumscribing an air cushion space under the airplane fuselage, said cell being formed with air outlet openings aligned peripherally of the bottom contour of said cell, valve means associated with the outlet openings of said cell, and means for actuating said valve means to open condition when said cell is inflated whereby to permit air to blast through said openings and to feed said air cushion space with pressured air for generation of airplane supporting ground effect forces whenever the airplane is disposed in close proximity to a reaction surface.

11. In an airplane, an elastic cell structure attached to the airplane fuselage and adapted to be inflated into a balloon-like shape, a branch duct leading alternatively to said cell and to a position of discharge directed rearwardly of the airplane, compressor means carried within the airplane for pumping air into said branch duct, a flip-flop valve device for controlling flow of compressed air through said branch duct alternatively rearwardly of said fuselage, or into said cell for inflating said cell into extended balloon-like form whereby circumscribing an air cushion space under the airplane fuselage, said cell being formed with air outlet openings aligned peripherally of the bottom contour of said cell when inflated, valve means associated with the outlet openings of said cell, and means carried by the airplane for actuating said valve means to open condition whereby to permit air to blast through said openings and to feed said air cushion space with pressured air for generation of airplane supporting ground effect forces whenever the airplane is disposed in close proximity to a reaction surface.

12. In an airplane, an elastic cell type undercarriage structure attached to the airplane fuselage and adapted to be inflated into a balloon-like shape to stand away from said fuselage, a branch duct leading alternatively to said cell and to a thrust outlet directed rearwardly of the airplane into the ambient atmosphere, compressor means carried within the airplane for pumping air into said branch duct, a valve device for selectively controlling flow of compressed air through said branch duct either through said thrust outlet or into said cell for inflating said cell into extended balloon-like form, said valve device being disposed in said branch duct in such manner as to induce flow of air from said cell through said duct to said thrust outlet when said valve device is set to deliver compressed air to said thrust outlet thereby causing deflation and collapse of said cell into fuselage-hugging condition, said cell being formed with air outlet openings, valve means associated with the outlet openings of said cell, and means for actuating said valve means to open condition whereby to permit air to blast through said openings for generation of airplane supporting ground effect forces whenever the airplane is disposed in close proximity to a reaction surface.

13. In an airplane, an undercarriage comprising a plurality of elastic cell structures attached to the airplane fuselage and adapted to be inflated into balloon-like shapes, means carried within the airplane for delivering relatively low pressure gas into said cells and thereby inflating said cells into extended balloon-like forms circumscribing gas cushion spaces under the airplane fuselage, said cells being formed with gas outlet openings aligned peripherally of the bottom contours of said cells when inflated, elastically closed valve means associated with the outlet openings of said cells and means for delivering relatively high pressure gas to said valve means for actuating the latter to open condition whereby to permit gas to blast through said outlet openings and to feed said gas cushion spaces with pressured gas for generation of airplane supporting ground effect forces whenever the airplane is disposed in close proximity to a reaction surface.

14. In an airplane, an undercarriage comprising a plurality of elastic cell structures of toroidal plan forms attached to the airplane fuselage and adapted to be inflated into balloon-like shapes, means carried within the airplane for delivering relatively low pressure gas into said cells and thereby inflating said cells into extended balloon-like forms circumscribing gas cushion spaces under the airplane fuselage, said cells being formed with gas outlet openings aligned peripherally of the bottom contours of said cells when inflated, valve means associated with the outlet openings of said cells and means for delivering relatively high pressure gas to said valve means for actuating the latter to open condition whereby to permit gas to blast through said outlet openings and to feed said gas cushion spaces with pressured gas for generation of airplane supporting ground effect forces whenever the airplane is disposed in close proximity to a reaction surface.

15. In an airplane, an undercarriage comprising a pair of longitudinally tandem elastic cell structures attached to the airplane fuselage and adapted to be inflated into balloon-like shapes, means carried within the airplane for delivering relatively low pressure gas into said cells and thereby inflating said cells into extended balloon-like forms circumscribing gas cushion spaces under the airplane fuselage, said cells being formed with gas outlet openings aligned peripherally of the bottom contour of said cells when inflated, elastically closed valve means associated with the outlet openings of said cells and means for delivering relatively high pressure gas to said valve means for actuating the latter to open condition whereby to permit gas to blast through said outlet openings and to feed said gas cushion spaces with pressured gas for generation of airplane supporting ground effect forces whenever the airplane is disposed in close proximity to a reaction surface.

16. In an airplane, an undercarriage comprising a pair of longitudinally tandem elastic cell structures of closed circumferential plan forms attached to the airplane fuselage and adapted to be inflated into balloon-like shapes, one of said cell structures comprising a relatively large cell disposed substantially under the center of gravity of the airplane and the other of said cells comprising a relatively small cell disposed ahead of said larger cell, means carried within the airplane for delivering relatively low pressure gas into both said cells and thereby inflating said cells into extended balloon-like forms circumscribing separate gas cushion spaces under the airplane fuselage, each of said cells being formed with gas outlet openings aligned peripherally of the bottom contour of said cells when inflated, valve means associated with the outlet openings of said cells and means for actuating said valve means to open condition whereby to permit gas to blast through said outlet openings and to feed said gas cushion sapces with pressured gas for generation of airplane supporting ground effect forces whenever the airplane is disposed in close proximity to a reaction surface.

References Cited by the Examiner

UNITED STATES PATENTS

| | | | |
|---|---|---|---|
| 3,082,976 | 3/1963 | Dornier | 244—12 |
| 3,117,747 | 1/1964 | Creasey et al. | 244—12 |
| 3,124,322 | 3/1964 | Cockerell | 244—12 |
| 3,128,970 | 4/1964 | Tinajero et al. | 244—100 |

FERGUS S. MIDDLETON, *Primary Examiner.*

LARRY C. HALL, *Examiner.*